May 6, 1958     W. R. WELTY     2,833,470
ELECTRICAL BALLISTIC COMPUTING SYSTEM

Filed May 31, 1951     2 Sheets–Sheet 1

INVENTOR.
WILLIAM R. WELTY.
BY
Seymour M. Rosenberg
atty

INVENTOR.
WILLIAM R. WELTY.
BY
Seymour M. Greenberg
atty.

United States Patent Office 2,833,470
Patented May 6, 1958

2,833,470

ELECTRICAL BALLISTIC COMPUTING SYSTEM

William R. Welty, West Los Angeles, Calif., assignor, by mesne assignments, to Hughes Aircraft Company, a corporation of Delaware Application May 31, 1951, Serial No. 229,091

10 Claims. (Cl. 235—61.5)

The present invention relates to an electrical computing system and more particularly to an electrical computing system for computing the value of an unknown as a function of a plurality of variables, one of which is dependent upon two others of the plurality of variables.

More specifically, although the basic concept of the invention is applicable to any electrical computing system of the type described above, it is readily adaptable to velocity computing systems for relatively moving objects, and is particularly suitable to ballistics computing systems for computing the average velocity of a projectile relative to the object from which the projectile is discharged or fired. Still further, the invention will be described with particular reference to ballistics computers for airborne objects, it being understood, of course, that the principles disclosed herein are applicable to ballistics computers for objects traveling through media other than air.

In aircraft ballistics computers, one of the essential variables that must be determined accurately is the average velocity of the projectile relative to the aircraft as a function of time of flight of the projectile from the aircraft to the target. With this variable accurately determined, the computer may compute the product of the time of flight and the average relative velocity of the projectile and present a firing signal which will insure a target hit.

In theory, the variable average relative velocity of the projectile is a function of air density, air speed of the aircraft, initial velocity of the projectile relative to the aircraft, time of flight of the projectile, and gravity. Since the time of flight of the projectile is relatively short, gravity may be neglected without any appreciable effect on the accuracy of the desired result. Accordingly, the average velocity can be determined with the precision required for ballistics computers only by proper evaluation of the remaining variables. In considering air density, it is apparent that this is a function of both pressure and temperature, in accordance with the well-known gas law, as set forth below.

Several prior art devices have been devised to compute the average velocity variable, but each of these has proved to be ineffective both in theory and in practice. In one prior art arrangement, the air density is assumed to be proportional to air pressure, no weight being given either to air speed of the aircraft, or to temperature in determining the average relative velocity. In another prior art arrangement, the average velocity is assumed to be a straight line function of the initial velocity minus an air density factor, no consideration being given to the air speed of the aircraft. From the theory outlined above, it is apparent that neither of these prior art systems will produce a sufficiently accurate result for a ballistics computer. In practice, these systems have been proved to be highly inaccurate when compared with known experimental data.

The present invention discloses a novel approach to the design of a ballistics computer which overcomes the disadvantages of the prior art systems and produces a result which is substantially identical with that indicated by experimental data. According to this invention, consideration is first given to the available experimental data on the average projectile velocities at various relative air densities for zero air speed of the aircraft. A circuit is designed which matches this experimental data with a high degree of accuracy. The circuit is then modified to incorporate aircraft velocities as a variable. The resulting circuit is then analyzed theoretically to evaluate properly the various circuit constants. Finally, the theoretical circuit is mechanized into a computer which evaluates all of the variables and produces a resultant indication for the average velocity of the projectile which fully satisfies the available experimental data.

The complete mechanization of the computer includes a first computing circuit for computing the unknown average velocity as a function of all of the variables in accordance with the theoretical equations. This computing circuit includes a variable circuit element representing a factor which is a function of the air density. A second computing circuit computes this factor as a function of the variables air density, initial velocity of the projectile and air speed of the aircraft. The computation of the factor by the second circuit is then utilized by any suitable means to adjust the value of the variable circuit element in the first computing circuit.

It is again emphasized, however, that the computing system of the present invention is applicable to fields other than ballistics computers. Thus, the principle of the invention may be applied to an electrical computing system for computing the value of an unknown $X$ as a function of a plurality of variables, $v$, $w$, $x$, $y$, one of the plurality of variables $v$ being a function of $x$, $y$ and a variable $z$. The first computing circuit would compute $X$, while the second computing circuit computed $x$. The solution obtained by the second circuit would be applied to the first circuit.

Accordingly, it is an object of the present invention to provide an electrical computing system for computing the value of an unknown as a function of a plurality of variables, one of which is dependent upon two others of the plurality of variables.

An additional object of this invention is to provide a system for accurately computing the average relative velocity between a pair of objects moving at varying velocities relative to each other.

Another object is to provide a system for computing the average velocity of a projectile relative to the object from which the projectile is discharged as a function of the time of flight of the projectile.

A further object is to provide a ballistics computer which evaluates all of the essential variables involved in computing the average velocity of a projectile to produce a result which fully complies with experimental ballistics curves.

Still another object is to provide a ballistics computer which indicates the average velocity of a projectile in terms of air speed of the aircraft, initial velocity of the projectile, air density, and time of flight of the projectile.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
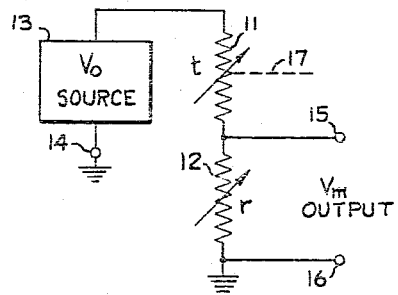
Fig. 1 is a circuit diagram of a network for computing the average relative velocity of a projectile at zero air speed of the aircraft.

Referring now to Fig. 1, there is shown a circuit diagram of a network which has been found empirical to match the known ballistics curves for zero air speed of the aircraft firing the projectile. This network comprises a pair of serially connected variable resistors 11 and 12 connected as a voltage divider across a source 13 of $V_0$ input signals, where $V_0$ is the muzzle velocity of the projectile, that is the initial velocity of the projectile relative to the aircraft at the instant of firing of the projectile. For any given projectile and firing mechanism, $V_0$ is a constant and may readily be converted into an electrical signal for application to the network of Fig. 1.

Resistor 11 constitutes one variable of the network, and its setting represents the time of flight $t$ of the projectile from the aircraft to the target. Resistor 12 constitutes the other variable of the network, and its setting represents the factor $r$, defined more particularly below, which is an inverse function of the air density $\rho$. Terminals 15 and 16 are the output terminals of the network, and the signal appearing thereacross, as demonstrated below, constitutes the output signal $V_m$, where $V_m$ is the average velocity of the projectile relative to the aircraft during the time of flight $t$. Preferably, terminals 16, and one terminal 14 of source 13, are returned to ground to complete the network.

In operation, the constant $V_0$ will have been determined previously and set into the network. The factor $r$ will be measured during the flight of the aircraft, or prior to firing if the aircraft is stationary, and, by mechanism described hereinafter, will determine the setting of resistor 12 for any given firing operation. With this setting of $V_0$ and $r$, resistor 11 will be varied at a predetermined rate in accordance with the variation in the time of flight $t$. In practice, resistor 11 will be varied automatically by a mechanism, shown in Fig. 4 responsive to time of flight $t$ as soon as $t$ decreases to a predetermined value. This synchronous variation of resistor 11 is indicated schematically by dashed line 17 in Fig. 1.

Figure 2:
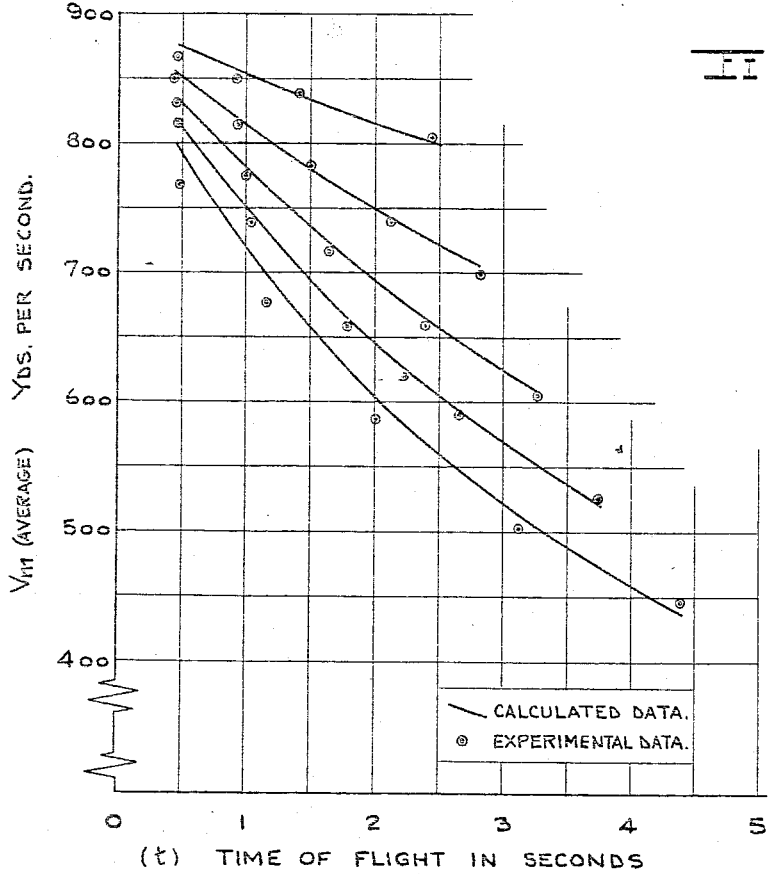
Fig. 2 is a graph of experimental data and curves calculated from the network of Fig. 1.

A comparison of the calculated responsive curves for the network of Fig. 1 and experimental data for a given projectile is shown in Fig. 2. The experimental data was obtained by measuring the range of the projectile for various times of flight, with relative air density $\rho/\rho_0$ as the parameter, where $\rho_0$ is a constant equal to the density of one atmosphere at a standard temperature. The average relative velocity $V_m$ was computed as the ratio of the range to the time of flight.

From Fig. 2, it can be observed that the calculated curves for the network of Fig. 1 match extremely well the experimental data obtained. The divergence between the calculated and experimental results for any given air density parameter is of such small magnitude as to be negligible for all practical purposes.

As pointed out above, it now becomes necessary to consider the variable $V_a$, the air speed of the aircraft, in order to adapt the computer for universal application. The logical attempt is to return the free end of resistor 12 to $-V_a$, since, as $t$ approaches infinity, $V_m$ approaches $-V_a$. Stated differently, if it is assumed that the projectile never hits the target or ground, the projectile decelerates with time of flight and finally stops as $t$ approaches infinity, at which time $V_m$ approaches $-V_a$. The modified network is shown in Fig. 3, where a source 18 of $-V_a$ input signals has one terminal 19 connected to the free end of resistor 12, the other terminal of source 18 being connected to ground, or terminal 16.

Figure 3:
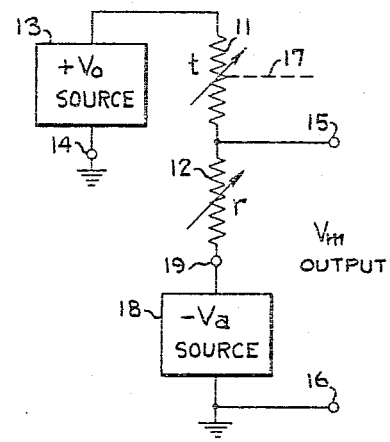
Fig. 3 is a circuit diagram of a modification of the network of Fig. 1, which incorporates variable air speed of the aircraft.

The equation for the network of Fig. 3 is:

$$V_m = \frac{rV_0 - tV_a}{r+t} \quad (1)$$

By differentiating Equation 1 with respect to time, one obtains:

$$V_m' = \frac{-r(V_0 + V_a)}{(r+t)^2} \quad (2)$$

Differentiation of Equation 2 with respect to time results in:

$$V_m'' = \frac{2r(V_0 + V_a)}{(r+t)^3} \quad (3)$$

By definition, the general equation of motion for $V_m$, in terms of the instantaneous velocity $v$ of the projectile, is:

$$V_m t = \int_0^t (v - V_a) dt$$

or $$V_m + tV_m' = v - V_a$$

or, solving for $v$, $$v = V_a + V_m + tV_m' \quad (4)$$

and, by differentiation, $$v' = V_m' + V_m' + tV_m'' = 2V_m' + tV_m'' \quad (5)$$

Combining Equations 1, 2, and 4, to obtain $v$ as a function of $V_a$, $V_0$, $t$, and $r$, results in:

$$v = V_a + \frac{rV_0 - tV_a}{r+t} - \frac{rt(V_0 + V_a)}{(r+t)^2}$$

$$= \frac{V_a(r+t)^2 + rV_0(r+t) - tV_a(r+t) - rt(V_0 + V_a)}{(r+t)^2}$$

$$v = \frac{r^2(V_0 + V_a)}{(r+t)^2} \quad (6)$$

Combining Equations 2, 3, and 5 results in:

$$v' = \frac{-2r(V_0 + V_a)}{(r+t)^2} + \frac{2rt(V_0 + V_a)}{(r+t)^3}$$

$$= \frac{2r^2(V_0 + V_a) - 2rt(V_0 + V_a) + 2rt(V_0 + V_a)}{(r+t)^3}$$

$$v' = \frac{-2r^2(V_0 + V_a)}{(r+t)^3} \quad (7)$$

To eliminate $t$ from Equation 7, $(r+t)$ may be replaced by a function of $v$ from Equation 6, and $$v' = \frac{2r^2(V_0 + V_a)}{r^3(V_0 + V_a)^{3/2}} \times v^{3/2}$$

$$v' = \frac{2v^{3/2}}{r(V_0 + V_a)^{1/2}} \quad (8)$$

In order to convert Equation 8 into the well-known ballistics equation wherein $v'$ is dependent on only $v$ and $\rho$, and remembering that $r$ has been defined as an inverse function of $\rho$, the equation for $r$, in terms of $\rho$, is:

$$K\rho = \frac{-2}{r(V_0 + V_a)^{1/2}}$$

where K is a constant, or $$r = \frac{-2}{K\rho(V_0 + V_a)^{1/2}} \quad (9)$$

Since the function $(V_0+V_a)^{1/2}$ is relatively difficult to mechanize, an approximation of this function, from the first two terms of the binomial expansion, yields:

$$(V_0+V_a)^{1/2} \approx V_0^{1/2}+\tfrac{1}{2}V_0^{-1/2}V_a$$

or $$(V_0+V_a)^{1/2} \approx \frac{V_0+\tfrac{1}{2}V_a}{V_0^{1/2}} \qquad (10)$$

Now, it can be shown that for all values of $V_0 \geq 3V_a$, which is the range of interest, the error introduced into the result by the approximation has a maximum value of 2 percent.

Accordingly, the use of Equation 10 is justified. Therefore, rewriting Equation 9, in terms of Equation 10:

$$r=\frac{-2V_0^{1/2}}{K\rho(V_0+\tfrac{1}{2}V_a)} \qquad (11)$$

The remaining steps in the determination of the factor $r$ are the evaluation of the constant $K$, and the conversion of air density $\rho$. Now, it should be remembered that, for $V_a=0$, the relationship between $r$ and $\rho$ has been established from the experimental data and the calculated curves of the network of Fig. 1, as shown in Fig. 2. This can be written as:

$$rV_a=0=\frac{C}{\rho} \qquad (12)$$

where C is a constant determined empirically from the network of Fig. 1.

Accordingly, evaluating Equation 11 for $V_a=0$, and comparing this with Equation 12, results in:

$$\frac{-2}{KV_0^{1/2}}=C$$

or $$\frac{-2}{K}=CV_0^{1/2} \qquad (13)$$

Substituting Equation 13 in Equation 11 presents:

$$r=\frac{CV_0}{\rho(V_0+\tfrac{1}{2}V_a)} \qquad (14)$$

Finally, using the ideal gas law $P=\rho RT$, where P and T are absolute pressure and temperature, respectively, and R is the known gas constant, Equation 14 can be rewritten as:

$$r=\frac{CV_0RT}{P(V_0+\tfrac{1}{2}V_a)} \qquad (15)$$

or $$r=\frac{DT}{P(V_0+\tfrac{1}{2}V_a)} \qquad (16)$$

where $D=CV_0R$, all known or evaluated constants.

It is apparent that Equation 16 can be mechanized by any system which compares the magnitude of the factor $rP(V_0+\tfrac{1}{2}V_a)$ to the magnitude of the factor DT, and adjusts the value of $r$ until equilibrium. One embodiment of an electrical system for performing this function, and its connections to the network of Fig. 3, is illustrated in Fig. 4.

Figure 4:
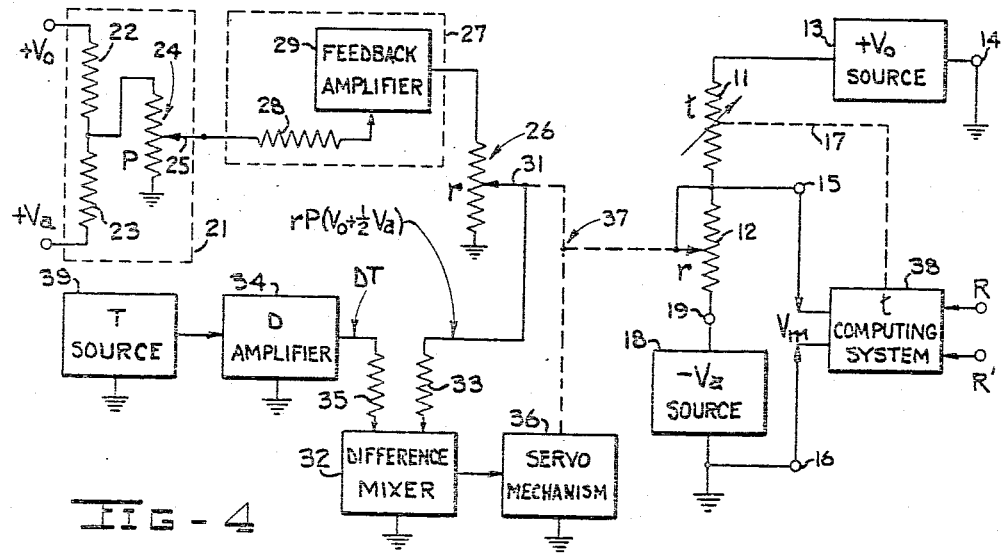
Fig. 4 is a schematic diagram of one form of ballistics computer according to the present invention.

Referring now to Fig. 4, a pair of positive input voltages proportional to $V_0$ and $V_a$, respectively, are applied to the input terminals of a linear mixing circuit 21 for producing an output signal whose magnitude is proportional to $P(V_0+\tfrac{1}{2}V_a)$. One suitable form of circuit 21 for accomplishing this result, as shown in Fig. 4, is an impedance network comprising a pair of series connected resistors 22 and 23 having their common junction connected to ground through a potentiometer, generally designated 24. The free ends of resistors 22 and 23, which constitute the input terminals of mixing circuit 21, are coupled to the sources, respectively, of $+V_0$ and $+V_a$ potential. Potentiometer 24 has the position of its movable tap 25 determined by the pressure variable P. Any conventional means, such as a static pressure line coupled to a transducer having a potentiometer at its output end, may be used to obtain P.

In operation, the resistance of potentiometer P is made large with respect to resistors 22 and 23, and the ratio of the resistances of resistors 22 and 23 is set at 1 to 2. In this manner the difference in potential between center tap 25 and ground, due to $V_0$ and $V_a$, is equal to $$P(V_0+\tfrac{1}{2}V_a)$$

within the limits of accuracy of the computing system.

It is understood, of course, that circuit 21 may be of any well-known form, other than that illustrated in Fig. 4. Thus, impedances other than resistors may be utilized, or conventional amplifiers may be substituted for resistors 22 and 23. Similarly, potentiometer 24 may be replaced by other forms of impedances, or by any well-known common load device. Accordingly, it should be apparent that circuit 21 is merely illustrative, and that any linear mixer for producing an output signal proportional to the sum of linear functions of the input signals, in the ratio set forth above, is contemplated for circuit 21.

The output potential of circuit 21 is applied across a variable circuit element, such as an $r$ potentiometer 26 through an isolation stage 27 in order to limit the loading of one of potentiometers 24 and 26 by the other. Other suitable forms of the variable circuit element are a variable gain amplifier or a variable transformer. Isolation stage 27 may take any suitable form, the particular form illustrated in Fig. 4 comprising a high impedance, such as a resistor 28, connected in series with a feedback amplifier 29. One suitable form of amplifier 29 is a cathode follower.

Potentiometer 26 has the setting of its movable tap 31 determined by the mechanism described below so that the potential between tap 31 and ground is equal to $rP(V_0+\tfrac{1}{2}V_a)$. This potential is applied to one input terminal of a mixer 32 through a coupling impedance, such as a resistor 33. Mixer 32 has its other input terminal connected to the output terminal of an amplifier 34 through a coupling impedance, such as a resistor 35. Amplifier 34 is utilized to produce an output signal proportional to the temperature parameter T, that is a signal equal to DT, where D is a constant, as set forth in connection with Equation 16. Accordingly, a source 39 applies a potential equivalent to temperature T to amplifier 34 which has an amplification ratio of D. Amplifier 34 may be any suitable vacuum tube amplifier, or a suitable step-up transformer.

Mixer 32 is any conventional difference amplifier for producing an output signal that is linearly related to the difference of linear functions of the input signals. Suitable forms of mixer 32 are illustrated in Fig. 2.45 at page 119 of "Electronics Experimental Techniques" by William C. Elmore and Matthew Sands, published in 1949 by McGraw-Hill Book Company, Inc., and which is hereby incorporated by reference in this application.

The output of mixer 32 is applied to the input terminals of a conventional servo mechanism 36 which controls the position of tap 31 of potentiometer 26 and of resistor 12 by a conventional mechanical linkage, generally designated 37. Servo mechanism 36 operates in a conventional and well-known follow-up manner to adjust the value of the resistance of potentiometer 31 to bring the input signal applied to mechanism 36 to its zero or null value.

In operation, $V_0$ is predetermined for each projectile and firing mechanism and is set in as a fixed signal applied to one input terminal of circuit 21, either from source 13 or from an independent source. $V_a$ is the air speed of the aircraft, and may be determined in any convenient and conventional manner. One means for obtaining $V_a$ is a Mach meter with a transducer for converting the meter indication into an electrical signal. $V_a$ is converted into an electrical signal, either in source 18 or in an independent source, which is applied to the other input terminal of circuit 21. The temperature T is determined in any conventional manner, such as a temperature probe, converted into an electrical signal in source 39, and applied to the input terminals of amplifier 34.

With this setting of the system of Fig. 4, servo mechanism 36 operates automatically to vary the value of potentiometer 26 until DT is equal to $rP(V_0+½V_a)$, as set forth in Equation 16. Resistor 12 is varied by mechanism 36, simultaneously with the variation of potentiometer 26, so that the value of $r$ represented by resistor 12 corresponds to the value of $r$ represented by potentiometer 26.

The remaining variable is the time of flight $t$, represented by the value of variable resistor 11. In practice, resistor 11 is continuously varied by a computing system, generally designated 38, through linkage 17. Computing system 38 solves for time $t$ the general equation:

$$V_m t = R + R't \quad (17)$$

where R is the range between the aircraft and the target, and R' is the rate or change of range R.

Since computing system 38 forms no part of the present invention, system 38 is not shown in detail in this application. However, it is clear that system 38 may be any servo system for solving Equation 17 by varying $t$ until the two sides of Equation 17 are equal. It is thus seen that the computing system of Fig. 4 operates simultaneously with computing system 38 to solve for variables $V_m$ and $t$.

In some instances, computing system 38 may present the $t$ function in terms of $1/t$, rather than as a direct proportionality. Accordingly, the system of Fig. 4 may be modified to operate with the $1/t$ variable. One such arrangement is illustrated in Fig. 5.

Figure 5:
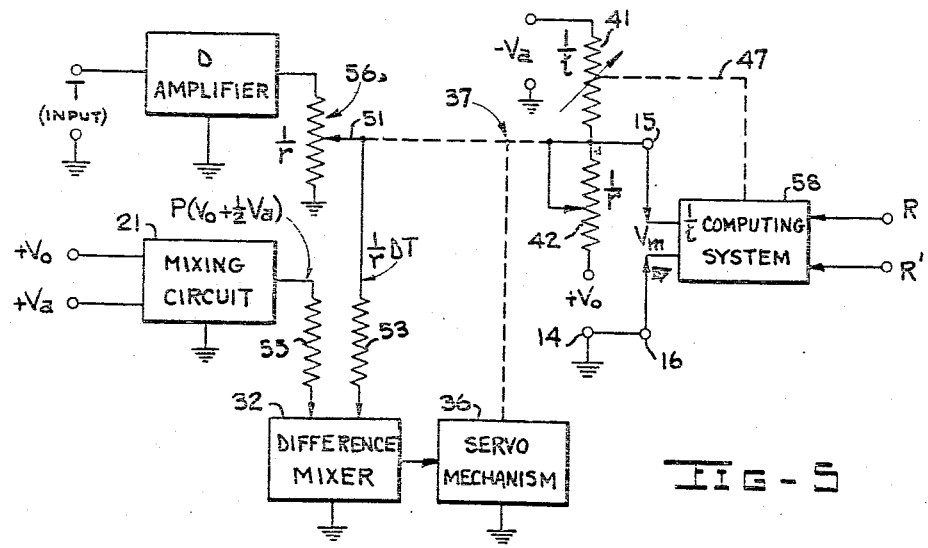
Fig. 5 is a schematic diagram of another form of ballistics computer.

Referring now to Fig. 5, D amplifier 34 has its output terminals coupled across a potentiometer 56 which functions as a $1/r$ potentiometer having its center tap 51 connected to one input terminal of mixer 32 through a resistor 53. Mixer 32 has its other input terminal coupled to the output terminal of circuit 21 through a resistor 55. A pair of series connected variable resistors 41 and 42, are coupled between terminal 19 of the $-V_a$ source and the positive terminal of the $V_0$ source, terminal 14 of the $+V_0$ source being connected to grounded output terminal 16. A $1/t$ computing system 58 has one pair of its input terminals connected to terminals 15 and 16, the $V_m$ output terminals, and controls the variation of resistor 41 through a linkage 47. System 58 may be a servo system, similar to system 38, for varying $1/t$ until $V_m$ is equal to $$\frac{1}{t}R + R'$$

In operation, mixer 32 equates the quantity $$\frac{1}{r}DT$$

to the quantity $P(V_0+½V_a)$ to actuate mechanism 36 which simultaneously varies the position of tap 51 of $1/r$ potentiometer 56 and the magnitude of $1/r$ resistor 42, through linkage 37. System 58 varies $1/t$ resistor 41 in the same manner as system 38 of Fig. 4 varies $t$ resistor 11. It can readily be seen that the equation for $V_m$ in the circuit of Fig. 5 is:

$$V_m = \frac{\frac{1}{t}V_0}{1/t+1/r} - \frac{\frac{1}{r}V_a}{1/t+1/r} \quad (18)$$

or $$V_m = \frac{rV_0 - tV_a}{r+t} \quad (19)$$

It is thus seen that the present invention discloses a ballistics computing system which considers all of the variables essential to a proper determination of the average relative velocity between the aircraft and the projectile. In this manner, the result attained has a degree of accuracy, far greater than that obtained by the prior art devices. The over-all result of this invention is the production of a ballistics computer which, for the first time, has the degree of accuracy required to render the computer an asset to an aircraft computing system.

What is claimed as new is:

1. A ballistics computer for computing the average velocity $V_m$ of a projectile discharged from an aircraft relative to the velocity $V_a$ of the aircraft, said computer comprising: a first circuit for producing a first electrical signal proportional to $P(V_0+½V_a)$, where P is the air pressure and $V_0$ the initial velocity of the projectile; a first variable circuit element electrically coupled to said first circuit for producing a second electrical signal proportional to said first electrical signal multiplied by a factor $r$; a second circuit for producing a third electrical signal proportional to DT, where D is a predetermined constant and T is the air temperature; a mixer for combining said second and third signals to produce an output signal proportional to the difference between said second and third signals; a computing circuit for electrically solving the equation:

$$V_m = \frac{rV_0 - tV_a}{r+t}$$

where $t$ is the time of flight of the projectile from the aircraft to the target, said computing circuit including a second variable circuit element representing the factor $r$; and follow-up means coupled to said first circuit element and responsive to the output signal of said mixer for varying said first circuit element to reduce the output signal of said mixer to zero, said follow-up means being coupled to said second circuit element for varying said second circuit element simultaneously with the variation of said first circuit element.

2. A ballistics computer for computing the average velocity $V_m$ of a projectile discharged from an aircraft relative to the velocity $V_a$ of the aircraft, said computer comprising: a first circuit for producing a first electrical signal proportional to $P(V_0+½V_a)$, where P is the air pressure and $V_0$ is the initial velocity of the projectile; a second circuit for producing a second electrical signal proportional to DT, where D is a predetermined constant, and T is the air temperature; a first variable circuit element electrically coupled to one of said circuits for producing a third electrical signal proportional to the signal produced by said one circuit multiplied by a linear function of a factor $r$; a mixer for combining said third signal and the signal produced by the other of said circuits to produce an output signal proportional to the difference between the combined signals; a computing circuit for electrically solving the equation:

$$V_m = \frac{rV_0 - tV_a}{r+t}$$

where $t$ is the time of flight of the projectile from the aircraft to the target, said computing circuit including a second variable circuit element representing a function of the factor $r$ similar to said linear function; and follow-up means coupled to said first circuit element and responsive to the output signal of said mixer for varying said first circuit element to reduce the output signal of said mixer to zero, said follow-up means being coupled to said second circuit element for varying said second circuit element simultaneously with said first circuit element.

3. A ballistics computer for computing the average velocity $V_m$ of a projectile discharged from an aircraft relative to the velocity $V_a$ of the aircraft, said computer comprising: a first computing circuit for electrically solving for $r$ a first equation $DT - rP(V_0+½V_a) = 0$, where D is a predetermined constant, T is the air temperature, P is the air pressure, and $V_0$ is the initial velocity of the projectile, said first computing circuit including a first variable circuit element representing the factor $r$, and means coupled to said first variable circuit element and responsive to solutions of said first equation other than zero for varying said first variable circuit element until a zero solution is obtained; a second computing circuit for electrically solving for $V_m$ a second equation:

$$V_m = \frac{rV_0 - tV_a}{r+t}$$

where $t$ is the time of flight of the projectile from the aircraft to the target, said second computing circuit including a second variable circuit element representing the factor $r$; and means coupled to the first-named means for varying said second variable circuit element simultaneously with said first variable circuit element.

4. A ballistics computer for computing the average velocity $V_m$ of a projectile discharged from an aircraft relative to the velocity $V_a$ of the aircraft, said computer comprising: a first computing circuit for electrically solving for $V_m$ as a function of $V_a$, initial velocity $V_0$ of the projectile, time of flight $t$ of the projectile from the aircraft to the target, and a variable quantity $r$, said first computing circuit including a variable circuit element representing said variable quantity $r$; a second computing circuit for electrically solving for said variable quantity $r$ as a function of $V_0$, $V_a$, air temperature T, and air pressure P; and means coupled between said first and second computing circuits for varying said variable circuit element in accordance with the solution for $r$ obtained by said second computing circuit.

5. A ballistics computer for computing the average velocity $V_m$ of a projectile discharged from an aircraft relative to the velocity $V_a$ of the aircraft, said computer comprising: a first computing circuit for electrically solving for a factor $r$ a first equation $CV_0 = r\rho(V_0 + \frac{1}{2}V_a)$, where C is a predetermined constant, $V_0$ is the initial velocity of the projectile, and $\rho$ is the air density, said first computing circuit including a first variable circuit element representing the factor $r$ in said first computing circuit, and means coupled to said first variable circuit element and responsive to electrical signals in said first computing circuit representative of inequalities in the two sides of said first equation for varying said first variable circuit element to eliminate said electrical signals; a second computing circuit for electrically solving for $V_m$ a second equation:

$$V_m = \frac{rV_0 - tV_a}{r+t}$$

where $t$ is the time of flight of the projectile from the aircraft to the target, said second computing circuit including a second variable circuit element representing the factor $r$ in said second computing circuit; and means coupled to the first-named means for varying said second variable circuit element simultaneously with said first variable circuit element.

6. A ballistics computer for computing the average velocity $V_m$ of a projectile discharged from an aircraft relative to the velocity $V_a$ of the aircraft, said computer comprising: a first computing circuit for electrically solving for $V_m$ as a function of $V_a$, initial velocity $V_0$ of the projectile, time of flight $t$ of the projectile from the aircraft to the target, and a variable quantity $r$, said first computing circuit including a variable circuit element representing the variable quantity $r$ in said first computing circuit; a second computing circuit for electrically solving for the variable quantity $r$ as a function of $V_0$, $V_a$, and air density $\rho$; and means coupled between said second computing circuit and said variable circuit element for varying said variable circuit element in accordance with the solution for $r$ obtained by said second computing circuit.

7. A ballistics computer for computing the average velocity $V_m$ of a projectile discharged from an aircraft relative to the velocity $V_a$ of the aircraft as a function of $V_a$, the initial velocity $V_0$ of the projectile, the air temperature T, the air pressure P, and time of flight $t$ of the projectile from the aircraft to the target, said computer comprising: a first electrical circuit for combining a pair of electrical signals representing $V_0$ and $V_a$, respectively, to produce a first electrical output signal representing $P(V_0 + \frac{1}{2}V_a)$; a first variable circuit element for producing a second electrical output signal equal to said first output signal multiplied by the factor $r$; a second electrical circuit for receiving an electrical signal representing T and producing a third electrical output signal representing DT, where D is a predetermined constant; a third electrical circuit for combining said pair of electrical signals representing $V_0$ and $V_a$ to produce a fourth electrical output signal representing $V_m$, said third electrical circuit including a second variable circuit element representing said factor $r$; a mixer for combining said second and third electrical output signals to produce a fifth electrical output signal proportional to the difference between said second and third electrical output signals; and means coupled to said first variable circuit element and responsive to said fifth electrical output signal for varying said first variable circuit element to reduce said fifth electrical output signal to zero, said means being coupled to said second variable circuit element for varying said second variable circuit element simultaneously with the variation of said first variable circuit element.

8. In a ballistics computer for computing the average velocity of an aircraft, wherein said computer includes a first computing circuit having a first variable circuit element representing one variable quantity involved in the computation of the average velocity, said one variable quantity being proportional to the ratio of a first variable to a second variable, the combination comprising: a second variable circuit element for receiving an electrical signal representing said second variable and producing a first electrical output signal representing said second variable multiplied by said one variable quantity; a mixer for combining said first electrical output signal with an electrical signal representing said first variable to produce a second electrical output signal proportional to the difference between said first electrical output signal and said electrical signal representing said first variable; and follow-up means coupled to said second variable circuit element and responsive to said second electrical output signal for varying said second variable circuit element to reduce said second electrical output signal to zero, said follow-up means being coupled to said first variable circuit element for varying said first variable circuit element simultaneously with said second variable circuit element.

9. In an electrical computing system for computing the value of an unknown, wherein said system includes a computing circuit having a first variable circuit element representing a factor involved in the computation of the unknown, said factor being proportional to the ratio of a first variable to a second variable, the combination comprising: a second variable circuit element for receiving an electrical signal representing said second variable and producing a first electrical output signal representing said second variable multiplied by said factor; a mixer for combining said first electrical output signal with an electrical signal representing said first variable to produce a second electrical output signal proportional to the difference between said first electrical output signal and said electrical signal representing said first variable; means coupled to said second variable circuit element and responsive to said second electrical output signal for varying said second variable circuit element until the magnitude of said first electrical output signal is equal to that of the electrical signal representing said first variable; and means coupled to the last-named means for varying said first variable circuit element simultaneously with said second variable circuit element.

10. An electrical computing system for computing the value of an unknown X as a function of a plurality of variables, $v$, $w$, $x$, and $y$, the variable $v$ being a function of $x$, $y$ and a variable $z$, said system comprising: a first electrical computing circuit for computing the value of the unknown $$X = \frac{vx - wy}{v + w}$$

and indicating the computed value of X as an electrical signal, said first electrical computing circuit including a variable circuit element representing $v$, a second electrical computing circuit for computing the value of the variable $$v = \frac{z}{k_1(x + k_2 y)}$$

where $k_1$ and $k_2$ are constants and means coupled between said second electrical computing circuit and said variable circuit element for varying said variable circuit element in accordance with the computation for $x$ obtained by said second computing circuit.

References Cited in the file of this patent

UNITED STATES PATENTS

| | | |
|---|---|---|
| 2,408,081 | Lovell et al. | Sept. 24, 1946 |
| 2,494,036 | Darlington | Jan. 10, 1950 |
| 2,545,655 | Doyle | Mar. 20, 1951 |

FOREIGN PATENTS

| | | |
|---|---|---|
| 625,023 | Great Britain | June 21, 1949 |

OTHER REFERENCES

"Electronic Instruments" by Greenwood, Holdam and MacRae, Radio Laboratory Series, vol. 21, published by McGraw-Hill in 1948. (Patent Office Technical Library; No. TK 7870 G7; reference is to page 139.)

UNITED STATES PATENT OFFICE

Certificate of Correction

Patent No. 2,833,470 May 6, 1958

William R. Welty

It is hereby certified that error appears in the printed specification of the above numbered patent requiring correction and that the said Letters Patent should read as corrected below.

Column 3, line 13, for "empirical" read —empirically—; column 4, line 22, for that portion of the equation reading $$\int_0^t \quad \text{read} \quad \int_0^t$$

column 5, line 22, for "$V_a={}_0$," read —$V_a=0$,—; lines 26 and 27, for the equation $$rV_a=0=\frac{C}{\rho} \quad \text{read} \quad r=\frac{C}{\rho} \text{for } V_a=0$$

Signed and sealed this 14th day of October 1958.

[SEAL]

Attest:
KARL H. AXLINE,
*Attesting Officer.*

ROBERT C. WATSON,
*Commissioner of Patents.*